(12) United States Patent
Haymond et al.

(10) Patent No.: US 9,364,081 B1
(45) Date of Patent: Jun. 14, 2016

(54) FOLDABLE TABLET STAND

(71) Applicant: American Covers, Inc., Draper, UT (US)

(72) Inventors: Bryce Haymond, West Valley, UT (US); Jason Fogg, Lake Point, UT (US)

(73) Assignee: American Covers, Inc., Draper, UT (US)

( * ) Notice: Subject to any disclaimer, the term of this patent is extended or adjusted under 35 U.S.C. 154(b) by 0 days.

(21) Appl. No.: 14/958,693

(22) Filed: Dec. 3, 2015

Related U.S. Application Data

(60) Provisional application No. 62/093,896, filed on Dec. 18, 2014.

(51) Int. Cl.
*A47B 97/04* (2006.01)
*A47B 23/04* (2006.01)
*G06F 1/16* (2006.01)

(52) U.S. Cl.
CPC ............ *A47B 23/044* (2013.01); *G06F 1/1613* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,812,318 A | * | 6/1931 | Bower | A47F 7/02 211/37 |
| D244,331 S | * | 5/1977 | Woods | D18/12 |
| D382,300 S | * | 8/1997 | Thorne | D19/90 |
| 5,915,661 A | * | 6/1999 | Silverman | F16M 11/10 248/454 |
| 6,776,385 B1 | * | 8/2004 | Chang | A47B 23/043 248/448 |
| 6,918,565 B2 | * | 7/2005 | Chang | A47B 23/043 211/169 |
| 7,735,799 B1 | * | 6/2010 | Antici | A47B 23/042 248/444.1 |
| 8,070,026 B2 | * | 12/2011 | Wadsworth | A45C 11/00 224/197 |
| 8,100,376 B2 | * | 1/2012 | Ye | A47B 23/043 248/454 |
| D658,168 S | * | 4/2012 | Werth | D14/253 |
| 8,387,938 B2 | * | 3/2013 | Lin | G06F 1/1632 248/397 |
| D681,646 S | * | 5/2013 | Ide | D14/447 |
| 8,518,510 B1 | * | 8/2013 | Wheatley | B32B 7/12 428/160 |
| 8,540,202 B2 | * | 9/2013 | Hu | F16M 11/10 108/6 |
| 8,579,246 B2 | * | 11/2013 | Chang | A47B 23/043 248/292.12 |
| 8,611,076 B2 | * | 12/2013 | Wetzel | F16M 11/105 248/121 |

(Continued)

*Primary Examiner* — Monica Millner
(74) *Attorney, Agent, or Firm* — Thorpe, North & Western LLP

(57) ABSTRACT

A folding stand for use with a mobile device comprises a front pair of legs being spaced-apart from one another defining a gap, and having a front foot at the bottom end interconnecting the front pair of legs. A rear leg pivotally coupled to the front pair of legs. The front pair of legs and the rear leg having at least two positions with respect to one another, including: 1) a collapsed retracted position in which the rear leg is folded between the front pair of legs, and with the mobile device removed from the front foot; and 2) an expanded extended position in which the rear leg is unfolded from between the front pair of legs with bottom ends of the front and rear pairs of legs configured to be disposed on a support surface, and configured to receive the mobile device disposed on the front foot and leaning against the front pair of legs.

19 Claims, 4 Drawing Sheets

(56) References Cited

U.S. PATENT DOCUMENTS

| | | | |
|---|---|---|---|
| 8,659,887 B2 * | 2/2014 | Lee | F16M 11/041 206/759 |
| D703,659 S * | 4/2014 | Werth | D14/253 |
| 8,800,937 B1 * | 8/2014 | Lee | F16M 11/38 248/65 |
| 8,876,070 B2 * | 11/2014 | Liu | F16M 11/24 16/369 |
| 8,998,161 B2 * | 4/2015 | Larson | F16M 11/10 248/441.1 |
| 9,066,442 B2 * | 6/2015 | Huebner | F16M 11/10 |
| 9,121,541 B2 * | 9/2015 | Jones | F16M 13/00 |
| 9,155,213 B2 * | 10/2015 | Jones | H05K 5/0234 |
| 9,194,536 B2 * | 11/2015 | Kim | F16M 13/00 |
| 9,227,763 B2 * | 1/2016 | Gengler | B65D 25/00 |
| 9,274,556 B2 * | 3/2016 | Gallouzi | F16M 11/041 |
| 9,308,767 B1 * | 4/2016 | Waldron | B42D 15/042 |
| 2004/0056166 A1 * | 3/2004 | Harrison | G10G 5/00 248/434 |
| 2006/0175522 A1 * | 8/2006 | Axel | B42D 5/006 248/454 |
| 2008/0061205 A1 * | 3/2008 | Park | H04M 1/04 248/291.1 |
| 2008/0078109 A1 * | 4/2008 | Terleski | F16M 11/00 40/316 |
| 2008/0251659 A1 * | 10/2008 | Matias | A47B 23/044 248/166 |
| 2009/0179132 A1 * | 7/2009 | Qin | A47B 23/043 248/371 |
| 2010/0006735 A1 * | 1/2010 | Reinen | A47B 23/043 248/451 |
| 2010/0012812 A1 * | 1/2010 | Hu | G06F 1/1601 248/454 |
| 2010/0090085 A1 * | 4/2010 | Corrion | A47B 23/043 248/459 |
| 2010/0213331 A1 * | 8/2010 | Liou | F16M 11/10 248/176.3 |
| 2010/0320341 A1 * | 12/2010 | Baumann | B60R 11/0241 248/206.2 |
| 2011/0170246 A1 * | 7/2011 | Chu | F16M 13/00 361/679.01 |
| 2011/0253850 A1 * | 10/2011 | Bau | H04M 1/04 248/176.3 |
| 2012/0001045 A1 * | 1/2012 | Wang | F16M 11/10 248/281.11 |
| 2012/0037047 A1 * | 2/2012 | Moldovan | A47B 23/043 108/3 |
| 2012/0074271 A1 * | 3/2012 | Goetz | F16M 13/00 248/121 |
| 2012/0145835 A1 * | 6/2012 | Zaharakis | F16M 11/22 248/65 |
| 2012/0170194 A1 * | 7/2012 | Lord | G06F 1/1632 361/679.02 |
| 2012/0176689 A1 * | 7/2012 | Brown | G02B 3/08 359/742 |
| 2012/0325689 A1 * | 12/2012 | Wibby | A47B 23/043 206/45.2 |
| 2012/0326003 A1 * | 12/2012 | Solow | F16M 11/041 248/688 |
| 2013/0181106 A1 * | 7/2013 | Lin | F16M 11/10 248/463 |
| 2014/0061971 A1 * | 3/2014 | Haymond | B65D 43/022 264/299 |
| 2016/0069508 A1 * | 3/2016 | Haymond | F16M 11/38 |

\* cited by examiner

FOLDABLE TABLET STAND

PRIORITY CLAIM

Priority is claimed to U.S. Provisional Patent Application Ser. No. 62/093,896, filed Dec. 18, 2014, which is hereby incorporated herein by reference.

BACKGROUND

1. Field of the Invention

The present invention relates generally to a foldable tablet stand.

2. Related Art

Mobile devices are often held to view data and/or media displayed thereon. It can be fatiguing to hold the mobile device for extended period. The mobile device can also be placed on a table or the like. But the mobile device can be difficult to view when resting on the table.

SUMMARY OF THE INVENTION

It has been recognized that it would be advantageous to develop an apparatus or method for supporting a mobile device in an upright or inclined orientation to facilitate viewing. In addition, it has been recognized that it would be advantageous to develop such a device that is readily portable along with the mobile device.

The invention provides a folding stand for use with a mobile device. The folding stand comprises a front pair of legs that is spaced-apart from one another, and that define a gap therebetween. The front pair of legs has a top end and a bottom end. The front pair of legs has a front foot at the bottom end that interconnects the front pair of legs. The front pair of legs has an arcuate concave profile, with the front foot extending transverse to an upright portion. A rear pair of legs is pivotally coupled to the front pair of legs. The rear pair of legs is spaced-apart from one another, and has a top end pivotally coupled to the top end of the front pair of legs. The rear pair of legs has a bottom end, and a rear foot at the bottom end interconnecting the rear pair of legs. The rear pair of legs has a top spar extending therebetween at the top end. The rear pair of legs has an arcuate convex profile that substantially matches the front profile of the front pair of legs. The rear pair of legs has a width less than a width of the gap of the front pair of legs. The front and rear pairs of legs have at least two positions with respect to one another, including: 1) a collapsed retracted position, and 2) an expanded extended position. In the collapsed retracted position, the rear pair of legs is folded between the front pair of legs, and disposed within the gap between the front pair of legs. In the expanded extended position, the rear pair of legs is unfolded from between the front pair of legs, with the bottom ends of the front and rear pairs of legs configured to be disposed on a support surface, and configured to receive the mobile device disposed on the front foot and leaning against the front pair of legs. A face plate is on a front of the front foot, and has an outer surface and extending above the front foot to define a lip opposing the front pair of legs, and defining a channel therebetween configured to receive the mobile device in the expanded extended position.

In accordance with a more detailed aspect, each front leg of the front pair of legs can have a longitudinal cross-section with a pair of flanges separated by and interconnected by a web. Similarly, each rear leg of the rear pair of legs can have a longitudinal cross-section with a pair of flanges separated by and interconnected by a web. Each front leg of the front pair of legs can have a front bore extending therethrough at the top end. A rear bore can extend through the top spar. The rear bore of the rear pair of legs can be aligned with the front bores of the front pair of legs. A hinge pin can extend through the rear bore of the rear pair of legs and the front bores of the front pair of legs to define a hinge about which the rear pair of legs pivots with respect to the front pair of legs. The hinge pin can have enlarged heads on ends thereof. At least one end of the hinge pin can be bifurcated. The front and rear pairs of legs can have a detent removable received in a dimple in the collapsed retracted position to retain the rear pair of legs in the collapsed retracted position. One of the detent or the dimple can be carried by an inner surface of the front pair of legs; and another of the detent or the dimple can be carried by an outer surface of the rear pair of legs. Indicia can be disposed on the outer surface of the face plate, with the indicia indicative of or representing a business, a product, or both. A recess can be in the face plate. A polyurethane dome can be affixed in the recess. Indicia can be carried by the polyurethane dome, with the indicia indicative of or representing a business, a product, or both. A pad can be disposed on at least one of the feet of the front or rear pairs of legs.

In accordance with a more detailed aspect, each front leg can have an inner flange partially circumscribing a corresponding front bore at the top end. The top spar of the rear pair of legs can have an outer flange partially circumscribing the rear bore on each side of the top spar. Each outer flange of the top spar can intermesh with a corresponding inner flange of the front pair of legs. Opposing surfaces of corresponding inner and outer flanges can abut to one another in the expanded extended position. A bottom of the rear foot can oppose a back of the face plate in the collapsed retracted position, and a space can be defined therebetween.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
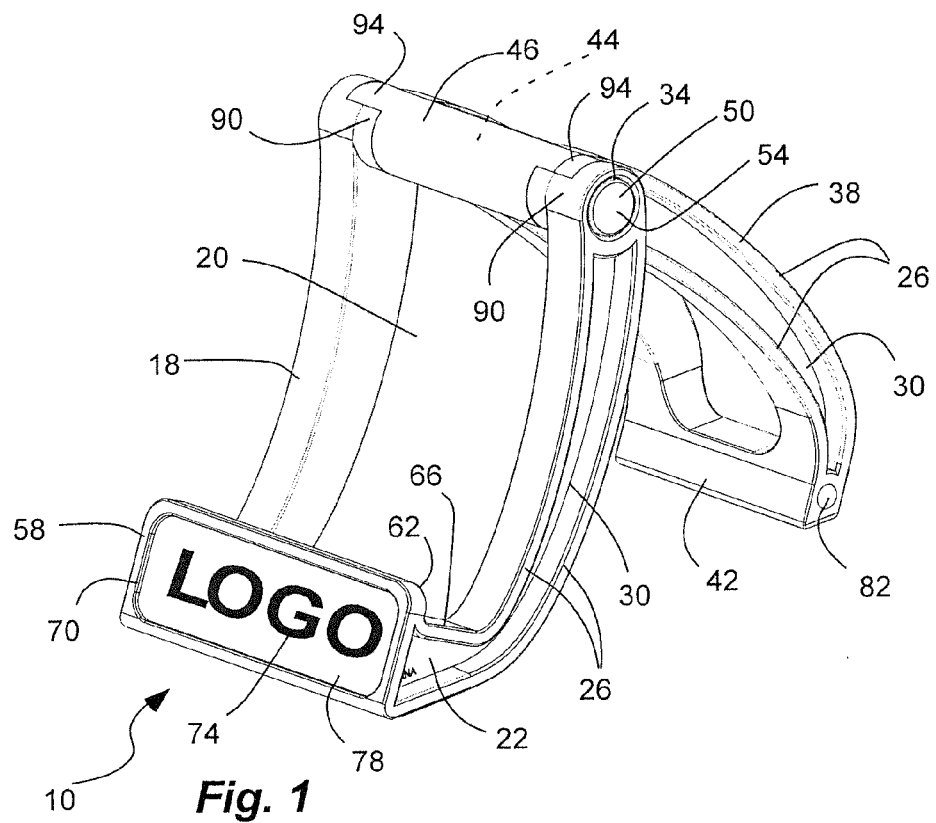
FIG. 1 is a perspective view of a folding stand in accordance with an embodiment of the invention configured to receive a mobile device, and shown in an expanded extended position or configuration in which a rear pair of legs is unfolded from between a front pair of legs.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both. The stand of the present invention can have indicia indicative of or representing a business, a product, or both. The indicia can include, for example, a name, logo, slogan, trademark, service mark, etc. Thus, the stand can be utilized as a promotional device. The term produce is used broadly herein to include services offered by a business or organization.

The term "mobile device" is used broadly herein to refer to a portable, hand-held electronic device, including by way of example, a cellular (cell) phone, a smart phone, a tablet computer or tablet, a global positioning system (GPS), a mobile media player, a gaming system, and the like. Such a device can have a display screen upon which data, information, media, etc. is viewed; one or more inputs, such as buttons, a touch screen, etc.; one or more outputs, such as the screen, a speaker, an audio jack, etc.; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. Mobile devices can have various different sizes, including different widths, lengths, or both. The width can extend laterally, side-to-side; while the height can extend longitudinally, up-and-down. The mobile device can be rectangular with a smaller width and a greater height.

The term "cellular phone" is used broadly herein to refer to a cellular phone, a cell phone, a smart phone, etc. Such cellular phones can be portable, handheld communication devices that can include a speaker, a microphone, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone. The term cellular phone is used broadly herein to refer to phablets. Cellular phones can have various different sizes, including different widths, lengths, or both. The width can extend laterally, side-to-side; while the height can extend longitudinally, up-and-down. The cellular phone can be rectangular with a smaller width and a greater height.

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can also have a removable keyboard. The tablet can be wide (or broad) and thin. For example, the screen can have a diagonal length greater than 7 inches, and a thickness less than a ¼-½ inch. The tablet can have a battery and memory and a processor with software running thereon. The tablet can have WiFi and Bluetooth connectivity. Thus, the tablet can provide internet browsing, game playing, movie and picture display, e-book display, etc. In addition, the tablet can include a digital camera. Furthermore, the terms tablet computer and tablet are used broadly herein to refer to phablets, which also provide similar computing capabilities, battery power, memory, processor, software, WiFi and Bluetooth connectivity, touch screen display, digital camera, etc.

Description

Figure 2:
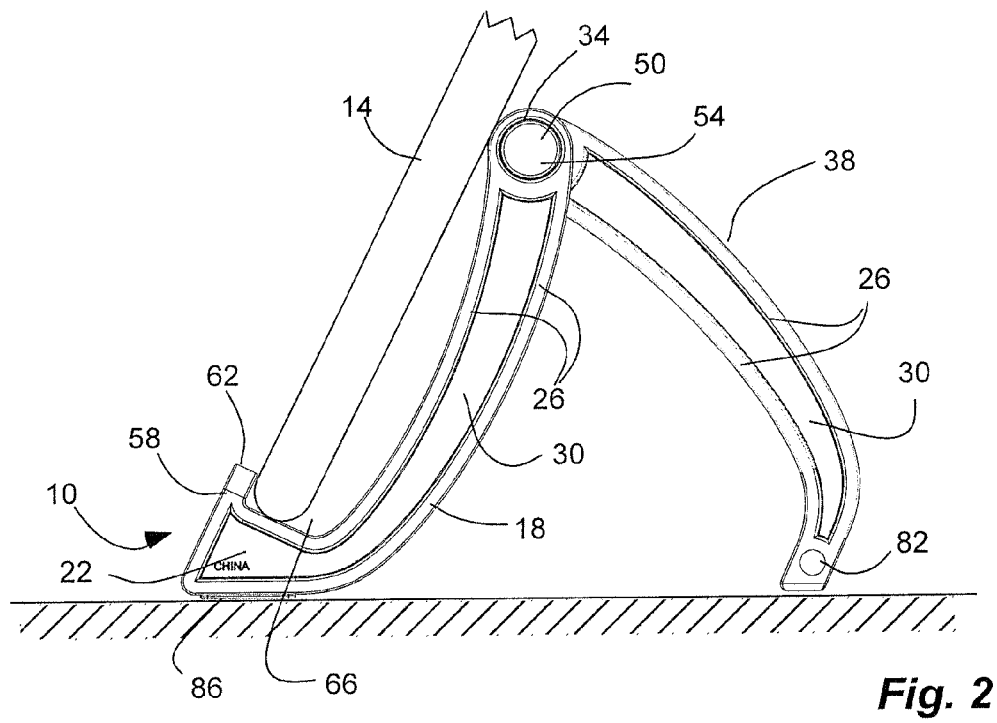
FIG. 2 is a side view of the folding stand of FIG. 1, shown in the expanded extended position with bottom ends of the front and rear pairs of legs are disposed on a support surface, and shown with the mobile device disposed on a front foot and leaning against the front pair of legs.
Figure 3:
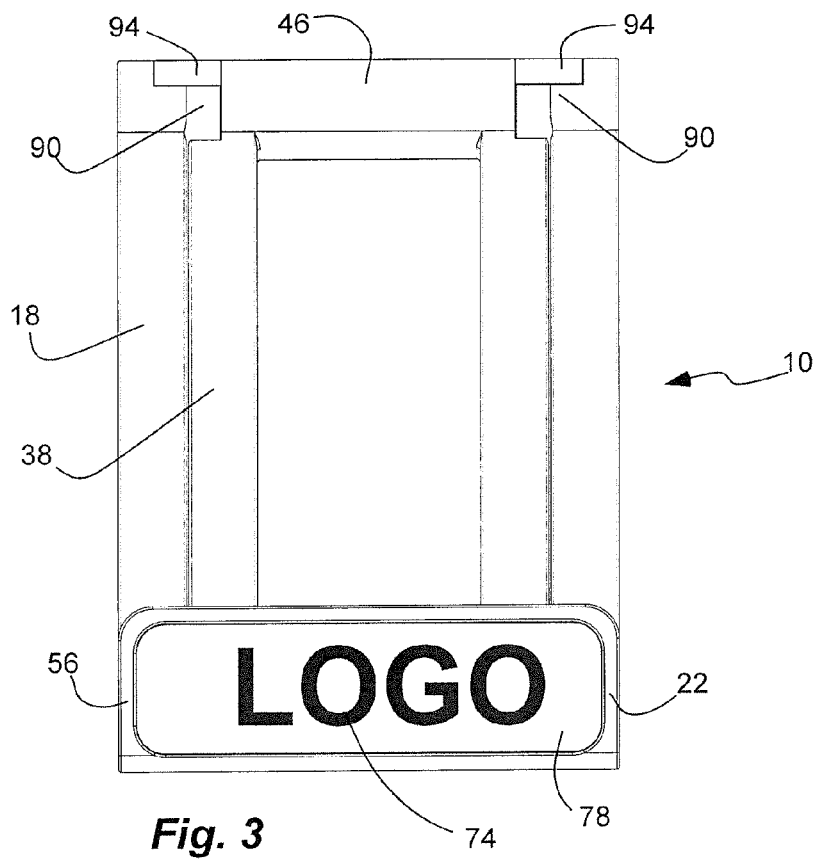
FIG. 3 is a front view of the folding stand of FIG. 1.
Figure 4:
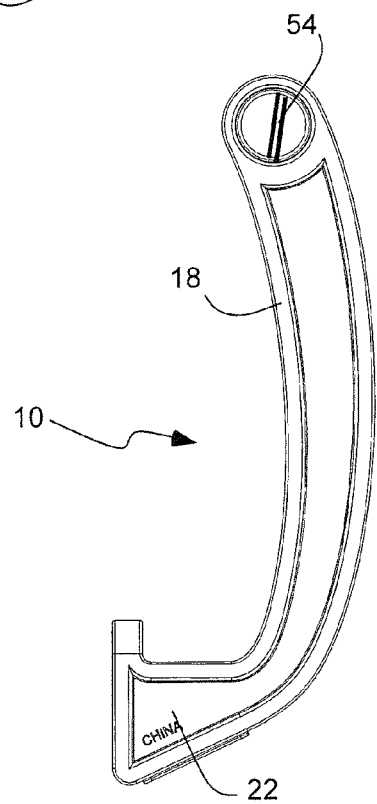
FIG. 4 is a side view of the folding stand of FIG. 1, shown in a collapsed retracted position or configuration in which the rear pair of legs is folded between the front pair of legs, and with the mobile device removed from the front foot.
Figure 5:
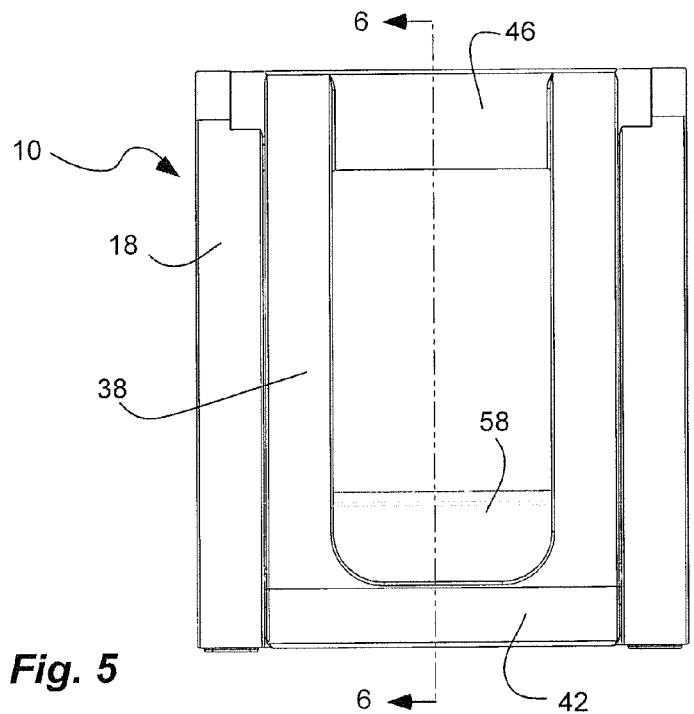
FIG. 5 is a rear view of the folding stand of FIG. 1.
Figure 6:
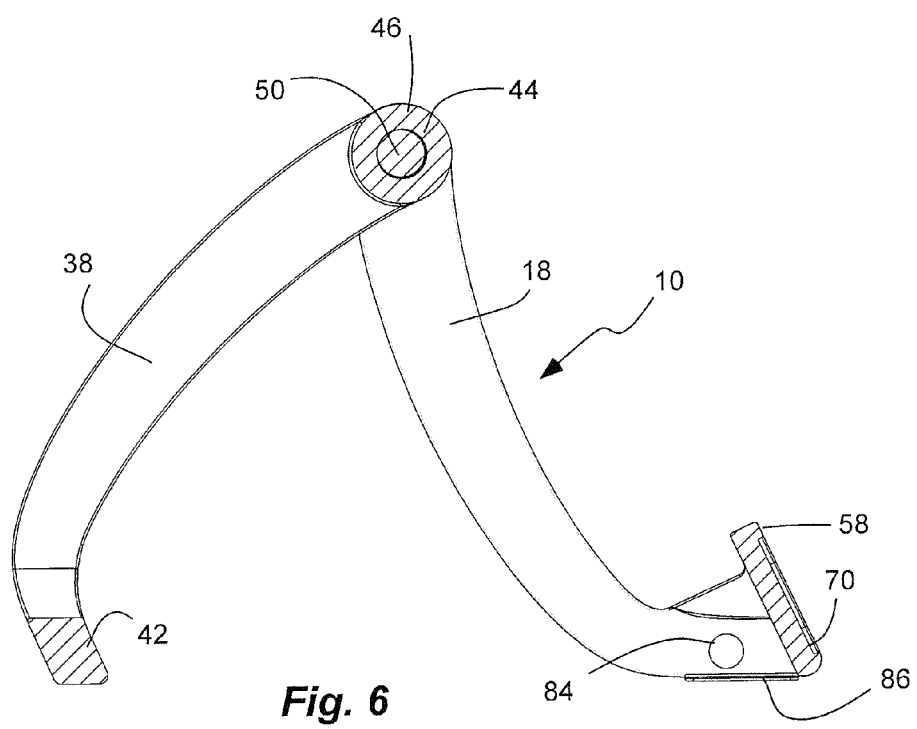
FIG. 6 is a cross-sectional side view of the folding stand of FIG. 1, taken along line 6 of FIG. 5.
Figure 7:
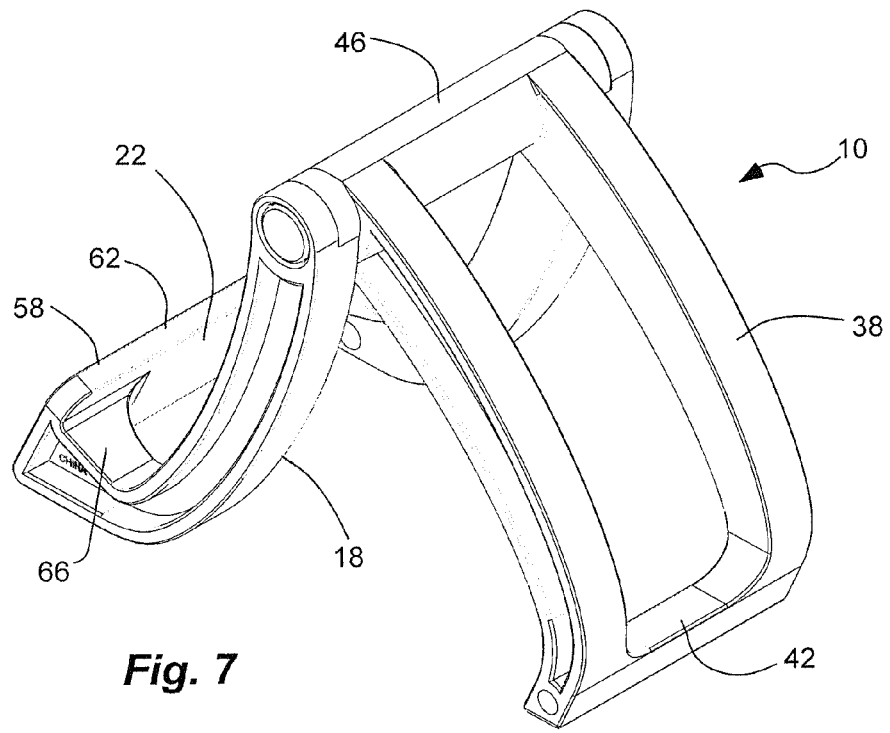
FIG. 7 is a perspective view of the folding stand of FIG. 1, shown in the expanded extended position.

Referring to FIGS. 1-8, a folding stand 10 is shown for use with a mobile device 14 (FIG. 2). The stand 10 can provide support and angled viewing for the mobile device 14. In addition, the stand 10 can be foldable so that it can be folded for easy mobility and storage. Furthermore, the stand 10 can be provided with a front plate or face to receive indicia, such as indicia indicative of or representing a business, a product, or both. Thus, the stand can be used as a promotional device, and given away by a business to promote its product or service.

The stand 10 has a front pair of legs 18 spaced-apart from one another and defining a gap 20 therebetween. The front legs 18 have a top end and a bottom end. In addition, the front legs 18 have a front foot 22 at the bottom end, interconnecting the front pair of legs. The front pair of legs 18 and the front foot 22 can form a block U-shape front member of the stand. The front pair of legs 18 can have an arcuate concave (with respect to the front) profile, as shown in FIG. 2. The front foot 22 can extend transverse to an upright portion of the arcuate profile, and an upright portion of the front legs. Such a profile can provide a nesting shape to receive the mobile device 14, as shown in FIG. 2. Each front leg 18 of the front pair of legs can have a cross-section (perpendicular to a longitudinal axis of the leg) with a pair of flanges 26 separated by and interconnected by a web 30. Such a cross-section can provide strength and rigidity. In one aspect, the web 30 can extend between a side of the flanges 26, and can form a channel with a closed end facing inwardly towards the gap 20. In addition, each front leg has a front bore 34 extending therethrough at the top end.

In addition, the stand 10 has at least one rear leg, or a rear pair of legs 38, pivotally coupled to the front pair of legs 18. The rear legs 38 can be spaced-apart from one another, and have a top end pivotally coupled to the top end of the front pair of legs 18. In addition, the rear legs 38 can have a bottom end. The rear legs 38 have a rear foot 42 at the bottom end interconnecting the rear pair of legs. Each rear leg 38 can have a cross-section with a pair of flanges 26 separated by and interconnected by a web 30. Again, such a cross-section can provide strength and rigidity. The rear legs 38 can have a top spar 46 extending therebetween at the top end. The rear pair of legs 38, the rear front foot 42 and the top spar 46 can form a block O-shape rear member of the stand. A rear bore 44 can extending through the top spar 42 of the rear legs 38, and can be aligned with the front bores 34 of the front pair of legs 18. The rear legs 38 can have an arcuate convex (with respect to the rear) profile that substantially matches the front profile of the front pair of legs 18. The rear pair of legs 38 can have a width less than a width of the gap 20 of the front pair of legs 18. Thus, the rear legs 38 can nest in the gap 20 of the front legs 18 when folded to provide a compact, transportable and storable stand.

A hinge pin 50 can extend through the rear bore 44 of the rear legs 38 and the front bores 34 of the front legs 18 to define a hinge about which the rear legs pivot with respect to the front legs. The hinge pin 50 can have enlarged heads 54 on ends thereof to resist the hinge pin from being removed from the bores. In one aspect, at least one end of the hinge pin or enlarged heads can be bifurcated to allow the end or head to be inserted into the bores, and then expand to resist removal.

The front and rear legs 18 and 38 can have at least two positions with respect to one another, including: 1) a collapsed retracted position (FIGS. 4 and 8) with the rear legs retracted, and 2) an expanded extended position (FIGS. 1, 2 and 7) with the rear legs extending and receiving the mobile device 14. In the collapsed retracted position (FIGS. 4 and 8), the rear legs 38 can be folded into the gap 22 between the front legs 18. As described above, the rear legs 38 can nest within the gap 20, and within the profile of the front legs. The collapsed retracted position allows for a smaller size and easier storage and mobility of the stand. The mobile device 14 can be removed from the front foot 22 in the collapsed retracted position. In the expanded extended position (FIGS. 1, 2 and 7), the rear legs 38 are unfolded from the gap 20 between the front legs 18 with the bottom ends of the front and rear pairs of legs disposed on a support surface (such as the ground, or a table top or desk top). The mobile device 14 can be disposed on the front foot 22, and can leaning against the front pair of legs 18.

In addition, the stand 10 can also have a face plate 58 with an outer surface on a front of the front foot 22. The face plate 58 extends above the front foot 22 to define a lip 62 opposing the front pair of legs 18, and defining a channel 66 therebetween to receive the mobile device 14. In addition, the face plate 58 can have a recess 70 therein. The stand 10 can have indicia 74, such as a logo, carried by the face plate 58, and visible to a user of the stand. The indicia 74 can be indicative of or represent a business, a product, or both. Furthermore, a polyurethane dome 78 can be affixed in the recess 70. The indicia 74 can be carried by the polyurethane dome 78. Additional details of the polyurethane dome are described below.

The front legs 18 and the front foot 22 and the face plate 58 can be formed together at the same time from injection molded plastic. Similarly, the rear legs 38 and the rear foot 42 and the top spar 46 can be formed together at the same time from injection molded plastic. The hinge pin 50 can be formed of injection molded plastic.

The legs 18 and 38 of the stand 10 can have a snap fit in the collapsed retracted position. The front and rear legs 18 and 38 can have a detent 82 removable received in a dimple 84 (FIG. 6) in the collapsed retracted position to retain the rear pair of legs 38 in the collapsed retracted position in the gap 20 between the front legs 18. One of the detent or the dimple can be carried by an inner surface of the front pair of legs, and another of the detent or the dimple carried by an outer surface of the rear pair of legs. In one aspect, a pair of detents 82 can be formed on the exterior surfaces of the rear legs 38, while the dimple 84 can be formed on the inner surface of the front pair of legs 18. In another aspect, the pair of detents can be carried on the inner surface of the front pair of legs, while the dimples can be formed on the exterior surfaces of the rear pair of legs. In addition, at least one pad 86 can be disposed on at least one of the feet of the front or rear pairs of legs. The pads can define high friction, non-skid surfaces.

Figure 8:
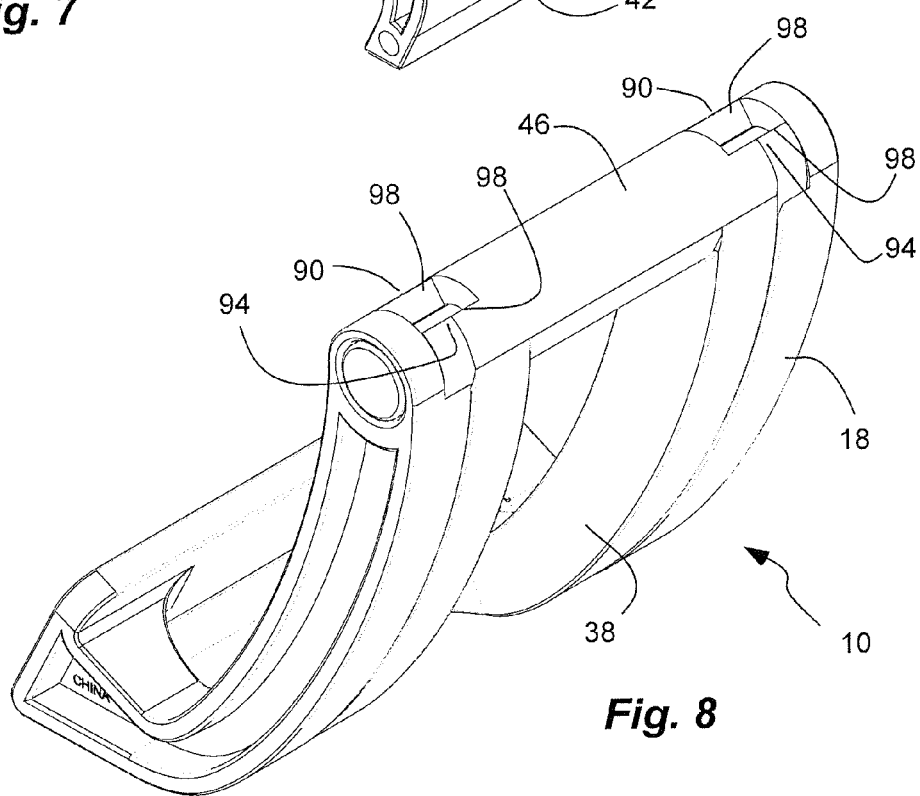
FIG. 8 is a perspective view of the folding stand of FIG. 1, shown in the collapsed retracted position.

The hinge connecting the front and rear legs 18 and 38 can have a stop to limit the angle of the front and rear legs in the expanded extended position. Each front leg 18 can have an inner flange 90 partially circumscribing a corresponding front bore 34 at the top end. Similarly, the top spar 46 of the rear pair of legs 38 can have an outer flange 94 partially circumscribing the rear bore 44 on each side of the top spar. Each outer flange 94 of the top spar 46 or the rear legs 38 can intermesh with a corresponding inner flange 90 of the front pair of legs 18. Opposing surfaces 98 of the corresponding inner and outer flanges 90 and 94 can abut to one another in the expanded extended position. A gap or space can be formed between the opposing surfaces 98 of the inner and outer flanges 90 and 94 in the collapsed retracted position, as shown in FIG. 8. In addition, different opposing surface of the corresponding inner and outer flanges can abut to one another in the collapsed retracted position.

In addition, a bottom of the rear foot 42 can oppose a back of the face plate in the collapsed retracted position, and a space can be defined therebetween. The space can receive a user's finger to open the stand.

As described above, the stand 10 can include indicia 74 that can be indicative of or representing a business, a product, or both. Thus, the stand can be utilized as a promotional device, and distributed to potential customers, to place the indicia in ready view of users. Thus, the indicia can include a logo or picture. In another aspect, the indicia can include instructions for use, warnings regarding use, etc. The indicia 74 can be disposed on an outward facing surface of the face plate 58. In one aspect, the indicia can be formed on the face plate, or in the recess 70, by screen printing, pad printing, etc. The recess can protect the indicia.

In another aspect, a polyurethane dome 78 can be affixed in the recess 70. The polyurethane dome can include or can carry the indicia. In addition, the polyurethane dome can have tacky properties to which items can be removably secured. The items can include, paper notes, paper receipts, keys, etc.

The polyurethane dome 78 can be adhered to the face plate 58 or recess 70 or an outward facing surface thereof by an adhesive film. The dome 78 can have a broad, flat shape with an outfacing surface parallel with the face plate 58 or outward facing surface of the recess 70 or face plate, and surrounded by a radius perimeter. A majority, or essentially all, of the outward facing surface can be continuous and smooth and parallel with the face plate 58 or outward facing surface of the recess 70 or face plate. In addition, the outward facing surface can be flat or substantially flat. Furthermore, the outward facing surface can be surrounded by a radius perimeter. Thus, the perimeter of the outward facing surface curves toward the face plate. In one aspect, all of the outward facing surface can be flat and smooth and continuous between the radiused perimeter. Thus, the dome can resist snagging on other objects. The outfacing surface can be tacky, and can cling to an item by specific or mechanical adhesion. The tackiness of the outward surface can be obtained through various factors, which can include material, hardness/softness, and coefficient of friction. As described above, the dome can be formed of polyurethane. The polyurethane can be formed by combining a polyol with a catalyst or hardener. In one aspect, the ratio of polyol to catalyst can be between 0.85 to 0.95, and about 0.90 in another aspect, so that there is more polyol than catalyst. In another aspect, the ratio of polyol to catalyst can be between 0.63 to 0.85 in one aspect, and between 0.63 to 0.75 in another aspect, so that there is more polyol than catalyst. Typical polyurethane is obtained by mixing polyol and catalyst in a 1:1 ratio. In addition, in one aspect, the outward facing surface or dome can have a hardness between 10 and 35 Shore D. In another aspect, the outward facing surface or dome can have a hardness between 12 and 21 Shore D. In another aspect, the outward facing surface or dome can have a hardness between 12 and 18 Shore D. Other non-tacky stickers or decals typically can have a hardness of 60 Shore D or harder. Furthermore, the outward facing surface can have a coefficient of friction of between 0.3 and 0.1 in accordance with ASTM D 1894.

The polyurethane dome 78 can include an adhesive film adhered to the face plate 58 or recess thereof. The adhesive can be selected to provide sufficient adhesion between the polyurethane dome and the face plate or recess. The adhesive film can use a chemical adhesive that adheres to the face plate. In addition, the adhesive and/or the adhesive film can be substantially transparent, or at least translucent. The adhesive film can be disposed on a substrate. The substrate can also be a film. In one aspect, the substrate can be substantially non-absorbent. The substrate can provide a surface, such as an upper surface opposite the adhesive that can be printable. In addition, the substrate can be substantially transparent, or at least translucent. The substrate can be a printed 3M Graphics Vinyl. Alternatively, the substrate can be a polyester film. The substrate can be any laminated (non-porous) substrate, including: PP, PVC, PET, ABS, polyester, regular sticker paper, vinyl, or tin metal (foil). Alternatively, the substrate can be other films with other characteristics, such as reflective, metal shine, textured, etc. A strength of the adhesive bond between the adhesive film and the face plate can be greater than a tacky cling between the outward facing surface and the item(s). Thus, the dome remains on the face plate while the item is removed from the dome.

Furthermore, the polyurethane dome can be substantially transparent, or at least translucent. A graphic layer can be disposed behind the dome and visible through the dome. Thus, the graphic layer can be disposed between the face plate (or adhesive film) and the dome, or between the substrate and the dome. The graphic layer can include ink disposed on or printed on the substrate. For example, the graphic layer can be an aqueous based inkjet ink. The graphic layer can include the indicia. The graphic layer can include indicia that can be or can include letters, symbols, figures, pictures, logos, art, corporate messages, slogans, bi-lines, icons, etc. that are associated with or that form a representation of a business, company or organization or the like, or a product, service or the like, or both. Furthermore, the graphic layer can be or can include other inclusions, as described in greater detail below. The graphic layer can be visible through the dome. Thus, the dome can protect the indicia. The graphic layer and/or inclusion can be smaller or can have a smaller size than the substrate and dome such that the graphic layer and inclusion are surrounded by a perimeter of the dome and substrate.

As discussed above, the dome or outward facing surface can have a radius perimeter. The dome can be made by pouring the polyurethane material on top of the substrate and graphic layer to form the dome. Thus, the radius perimeter is obtained by individual pouring each dome, without stamping or cutting the domes from a continuous layer. The graphic layer can be printed on the substrate having the adhesive film opposite the graphic layer. The graphic layer can be a discrete graphic contained within the dome, as opposed to a continuous graphic.

As indicated above, the graphic layer can be or can include an inclusion. The inclusions can be embedded in the dome. For example, the graphic layer can be an etched metallic layer. The metallic layer can be etched to form the indicia. Other inclusions can be an LED (or other light source) and a battery power source; a hologram or lenticular artwork; an RFID computer chip or tag; a mirror; one or more gems or faux gems; etc. For example, the inclusion can be an LED electrically coupled to a battery. The LED may remain continuously activated or lit. Alternatively, the LED may be activated, or the leads for the LED selectively contacted by the battery, such as by pressure applied to the dome. Alternatively, a light sensor can be electrically coupled between the battery and the LED to activate the LED in low light conditions. Other electronics can be included for special effects, such as flashing, etc. It will be appreciated that multiple lights or LEDs of one or more color can be included or embedded in the dome. As another example, the inclusion can be a gem or faux gem embedded in the dome. The inclusion(s) can be disposed on the adhesive film and/or substrate, and surrounded by the material of the dome so that the inclusion projects into the dome. Thus, the inclusions can be inclusions for the dome and/or the graphics layer.

The dome can also include inclusions embedded therein. For example, the dome can include a scented material, such as a scented oil, that is permeable through the polyurethane material of the dome. In addition, the dome can be colored and translucent. Furthermore, the dome can include a florescent material.

In another aspect, the polyurethane layer or dome can be opaque with a graphic layer, such as printing, on the outfacing surface.

In another aspect, the indicia can be printed on or molded into the dome itself, such as on the top or front thereof.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A folding stand device configured to receive a mobile device, the folding stand device comprising:
   a) a front pair of legs being spaced-apart from one another and defining a gap therebetween, and having a top end and a bottom end, the front pair of legs having a front foot at the bottom end interconnecting the front pair of legs, the front pair of legs having an arcuate concave profile with the front foot extending transverse to an upright portion;
   b) a rear pair of legs pivotally coupled to the front pair of legs, the rear pair of legs being spaced-apart from one another and having a top end pivotally coupled to the top end of the front pair of legs, and having a bottom end, the rear pair of legs having a rear foot at the bottom end interconnecting the rear pair of legs, the rear pair of legs having a top spar extending therebetween at the top end, the rear pair of legs having an arcuate convex profile that substantially matches the front profile of the front pair of legs, the rear pair of legs having a width less than a width of the gap of the front pair of legs;
   c) the front and rear pairs of legs having at least two positions with respect to one another, including:
      i) a collapsed retracted position in which the rear pair of legs is folded between the front pair of legs and disposed within the gap between the front pair of legs; and
      ii) an expanded extended position in which the rear pair of legs is unfolded from between the front pair of legs with the bottom ends of the front and rear pairs of legs configured to be disposed on a support surface, and configured to receive the mobile device disposed on the front foot and leaning against the front pair of legs; and
   d) a face plate on a front of the front foot having an outer surface and extending above the front foot to define a lip opposing the front pair of legs and defining a channel therebetween configured to receive the mobile device in the expanded extended position, the front and rear pairs of legs having a detent removable received in a dimple in the collapsed retracted position to retain the rear pair of legs in the collapsed retracted position, with one of the detent or the dimple carried by an inner surface of the front pair of legs, and another of the detent or the dimple carried by an outer surface of the rear pair of legs.

2. The device in accordance with claim 1, further comprising:
 each front leg of the front pair of legs having a longitudinal cross-section with a pair of flanges separated by and interconnected by a web.

3. The device in accordance with claim 1, further comprising:
 each rear leg of the rear pair of legs having a longitudinal cross-section with a pair of flanges separated by and interconnected by a web.

4. The device in accordance with claim 1, further comprising:
 each front leg of the front pair of legs having a front bore extending therethrough at the top end;
 a rear bore extending through the top spar, the rear bore of the rear pair of legs being aligned with the front bores of the front pair of legs; and
 a hinge pin extending through the rear bore of the rear pair of legs and the front bores of the front pair of legs to define a hinge about which the rear pair of legs pivots with respect to the front pair of legs.

5. The device in accordance with claim 4, further comprising:
 the hinge pin having enlarged heads on ends thereof.

6. The device in accordance with claim 4, further comprising:
 at least one end of the hinge pin being bifurcated.

7. The device in accordance with claim 1, further comprising:
 indicia disposed on the outer surface of the face plate, the indicia indicative of or representing a business, a product, or both.

8. The device in accordance with claim 1, further comprising:
 a) a recess in the face plate;
 b) a polyurethane dome affixed in the recess; and
 c) indicia carried by the polyurethane dome, the indicia indicative of or representing a business, a product, or both.

9. The device in accordance with claim 1, further comprising:
 a pad disposed on at least one of the feet of the front or rear pairs of legs.

10. The device in accordance with claim 1, further comprising:
 a) each front leg having an inner flange partially circumscribing a corresponding front bore at the top end;
 b) the top spar of the rear pair of legs having an outer flange partially circumscribing the rear bore on each side of the top spar;
 c) each outer flange of the top spar intermeshing with a corresponding inner flange of the front pair of legs; and
 d) opposing surfaces of corresponding inner and outer flanges abutting to one another in the expanded extended position.

11. The device in accordance with claim 1, wherein a bottom of the rear foot opposes a back of the face plate in the collapsed retracted position and a space is defined therebetween.

12. The device in accordance with claim 1, further in combination with the mobile device.

13. A folding stand device configured to receive a mobile device, the folding stand device comprising:
 a) a front pair of legs being spaced-apart from one another and defining a gap therebetween, and having a top end and a bottom end, the front pair of legs having a front foot at the bottom end interconnecting the front pair of legs, the front pair of legs having an arcuate concave profile with the front foot extending transverse to an upright portion, each front leg of the front pair of legs having a longitudinal cross-section with a pair of flanges separated by and interconnected by a web, each front leg of the front pair of legs having a front bore extending therethrough at the top end;
 b) a rear pair of legs pivotally coupled to the front pair of legs, the rear pair of legs being spaced-apart from one another and having a top end pivotally coupled to the top end of the front pair of legs, and having a bottom end, the rear pair of legs having a rear foot at the bottom end interconnecting the rear pair of legs, each rear leg of the rear pair of legs having a longitudinal cross-section with a pair of flanges separated by and interconnected by a web, the rear pair of legs having a top spar extending therebetween at the top end with a rear bore extending through the top spar, the rear bore of the rear pair of legs being aligned with the front bores of the front pair of legs, the rear pair of legs having an arcuate convex profile that substantially matches the front profile of the front pair of legs, the rear pair of legs having a width less than a width of the gap of the front pair of legs;
 c) a hinge pin extending through the rear bore of the rear pair of legs and the front bores of the front pair of legs to define a hinge about which the rear pair of legs pivots with respect to the front pair of legs, the hinge pin having enlarged heads on ends thereof with at least one end being bifurcated;
 d) the front and rear pairs of legs having at least two positions with respect to one another, including:
  i) a collapsed retracted position in which the rear pair of legs is folded between the front pair of legs and disposed within the gap between the front pair of legs; and
  ii) an expanded extended position in which the rear pair of legs is unfolded from between the front pair of legs with the bottom ends of the front and rear pairs of legs configured to be disposed on a support surface, and configured to receive the mobile device disposed on the front foot and leaning against the front pair of legs;
 e) a face plate on a front of the front foot having an outer surface and extending above the front foot to define a lip opposing the front pair of legs and defining a channel therebetween configured to receive the mobile device in the expanded extended position;
 f) the front and rear pairs of legs having a detent removable received in a dimple in the collapsed retracted position to retain the rear pair of legs in the collapsed retracted position, with one of the detent or the dimple carried by an inner surface of the front pair of legs, and another of the detent or the dimple carried by an outer surface of the rear pair of legs;
 g) each front leg having an inner flange partially circumscribing a corresponding front bore at the top end;
 h) the top spar of the rear pair of legs having an outer flange partially circumscribing the rear bore on each side of the top spar;
 i) each outer flange of the top spar intermeshing with a corresponding inner flange of the front pair of legs; and j) opposing surfaces of corresponding inner and outer flanges abutting to one another in the expanded extended position.

14. The device in accordance with claim 13, further comprising:
   indicia disposed on the outer surface of the face plate, the indicia indicative of or representing a business, a product, or both.

15. The device in accordance with claim 13, further comprising:
   a) a recess in the face plate;
   b) a polyurethane dome affixed in the recess; and
   c) indicia carried by the polyurethane dome, the indicia indicative of or representing a business, a product, or both.

16. The device in accordance with claim 13, further comprising:
   a pad disposed on at least one of the feet of the front or rear pairs of legs.

17. The device in accordance with claim 13, wherein a bottom of the rear foot opposes a back of the face plate in the collapsed retracted position and a space is defined therebetween.

18. The device in accordance with claim 13, further in combination with the mobile device.

19. A folding stand device in combination with a mobile device, the folding stand device comprising:
   a) a front pair of legs being spaced-apart from one another and defining a gap therebetween, and having a top end and a bottom end, the front pair of legs having a front foot at the bottom end interconnecting the front pair of legs, the front pair of legs having an arcuate concave profile with the front foot extending transverse to an upright portion, each front leg of the front pair of legs having a longitudinal cross-section with a pair of flanges separated by and interconnected by a web, each front leg of the front pair of legs having a front bore extending therethrough at the top end;
   b) a rear pair of legs pivotally coupled to the front pair of legs, the rear pair of legs being spaced-apart from one another and having a top end pivotally coupled to the top end of the front pair of legs, and having a bottom end, the rear pair of legs having a rear foot at the bottom end interconnecting the rear pair of legs, each rear leg of the rear pair of legs having a longitudinal cross-section with a pair of flanges separated by and interconnected by a web, the rear pair of legs having a top spar extending therebetween at the top end with a rear bore extending through the top spar, the rear bore of the rear pair of legs being aligned with the front bores of the front pair of legs, the rear pair of legs having an arcuate convex profile that substantially matches the front profile of the front pair of legs, the rear pair of legs having a width less than a width of the gap of the front pair of legs;
   c) a hinge pin extending through the rear bore of the rear pair of legs and the front bores of the front pair of legs to define a hinge about which the rear pair of legs pivots with respect to the front pair of legs, the hinge pin having enlarged heads on ends thereof with at least one end being bifurcated;
   d) the front and rear pairs of legs having at least two positions with respect to one another, including:
      i) a collapsed retracted position in which the rear pair of legs is folded between the front pair of legs and disposed within the gap between the front pair of legs; and
      ii) an expanded extended position in which the rear pair of legs is unfolded from between the front pair of legs with the bottom ends of the front and rear pairs of legs configured to be disposed on a support surface, and receiving the mobile device disposed on the front foot and leaning against the front pair of legs;
   e) a face plate on a front of the front foot having an outer surface and extending above the front foot to define a lip opposing the front pair of legs and defining a channel therebetween receiving the mobile device in the expanded extended position;
   f) the front and rear pairs of legs having a detent removable received in a dimple in the collapsed retracted position to retain the rear pair of legs in the collapsed retracted position, with one of the detent or the dimple carried by an inner surface of the front pair of legs, and another of the detent or the dimple carried by an outer surface of the rear pair of legs;
   g) each front leg having an inner flange partially circumscribing a corresponding front bore at the top end;
   h) the top spar of the rear pair of legs having an outer flange partially circumscribing the rear bore on each side of the top spar;
   i) each outer flange of the top spar intermeshing with a corresponding inner flange of the front pair of legs;
   j) opposing surfaces of corresponding inner and outer flanges abutting to one another in the expanded extended position;
   k) a recess in the face plate;
   l) a polyurethane dome affixed in the recess;
   m) indicia carried by the polyurethane dome, the indicia indicative of or representing a business, a product, or both; and
   n) a pad disposed on at least one of the feet of the front or rear pairs of legs.

* * * * *